Nov. 20, 1928.  
G. O. DE HASS  
1,692,080  
FOLDING BED  
Filed Nov. 27, 1926 — 2 Sheets-Sheet 1
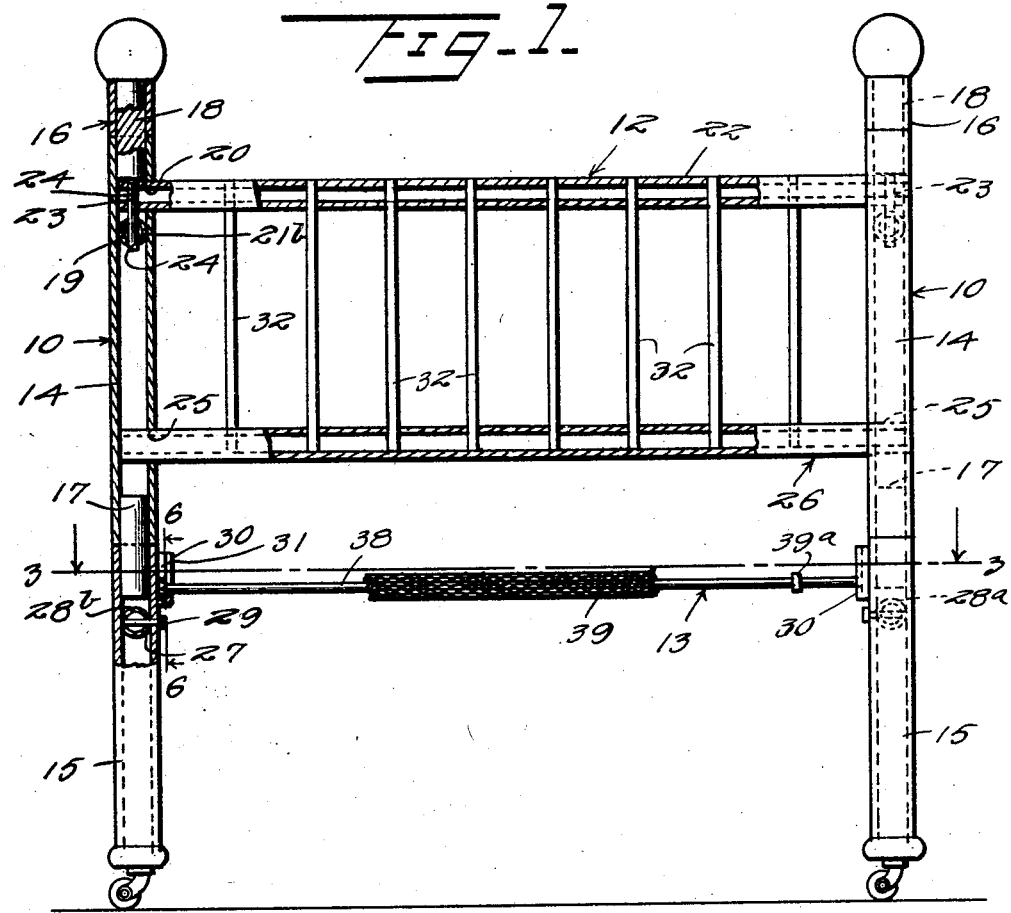
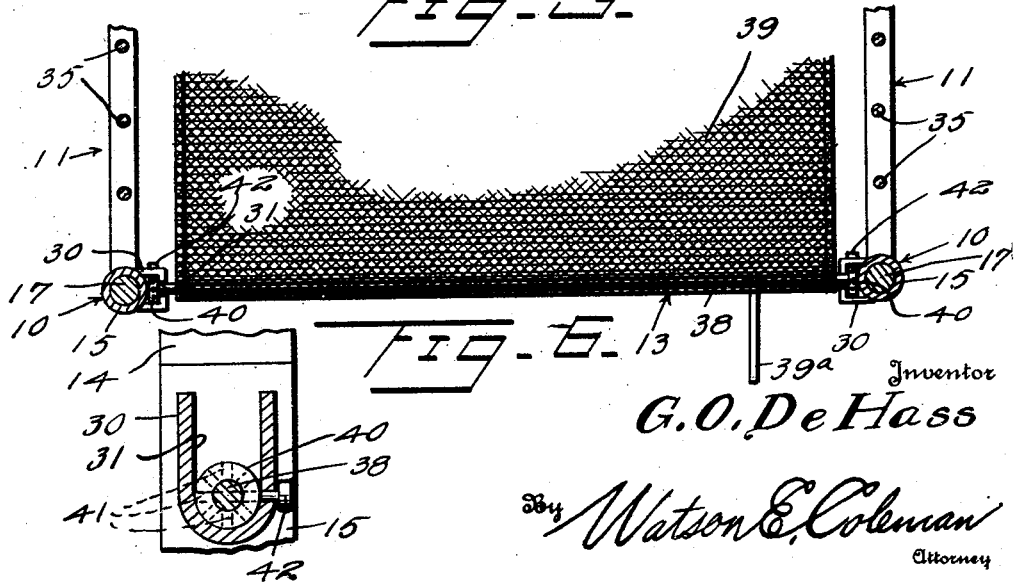
Inventor  
G. O. De Hass  
By Watson E. Coleman  
Attorney

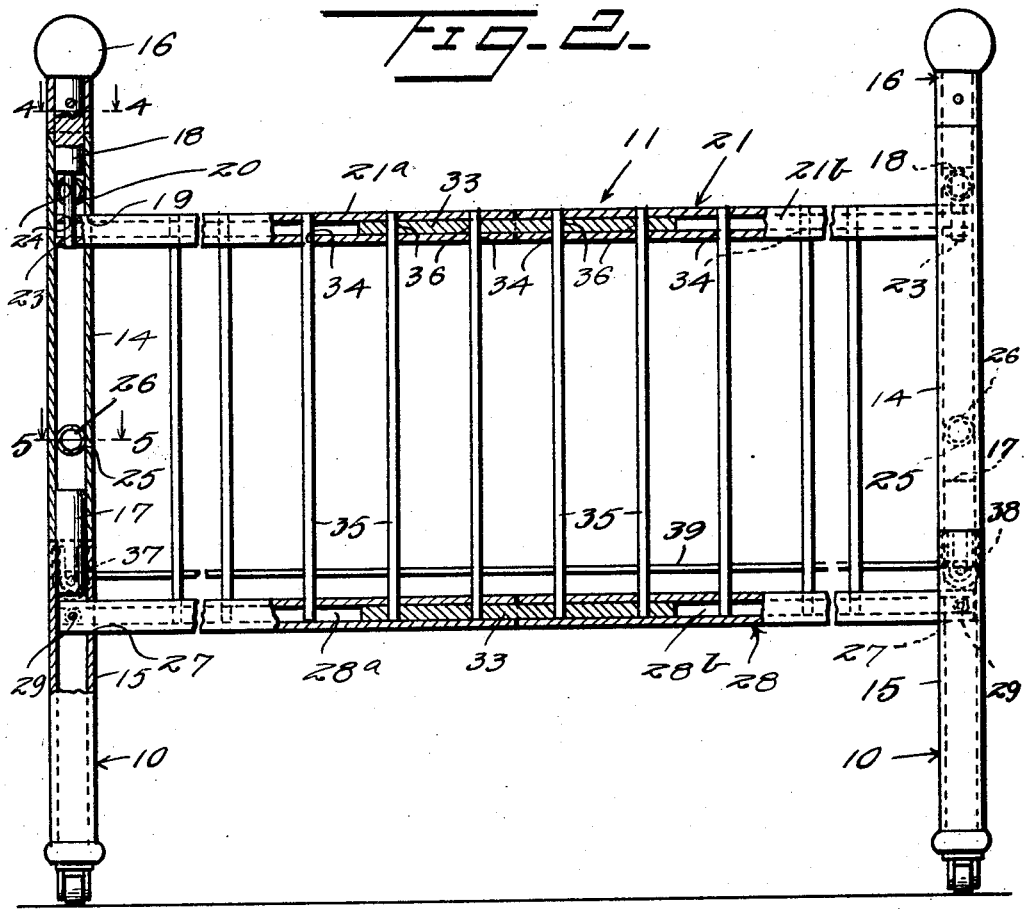

Patented Nov. 20, 1928.

1,692,080

UNITED STATES PATENT OFFICE.

GILBERT OTIS DE HASS, OF VANDALIA, MISSOURI.

FOLDING BED.

Application filed November 27, 1926. Serial No. 151,148.

This invention relates to folding beds and more particularly to a folding crib structure which may be reduced to such compass that it may be stored in a suitcase or similar receptacle.

A further object of the invention is to provide a device of this character having novel and improved means for locking the sections thereof in assembled relation.

These and other objects I attain by the construction shown in the accompanying drawings, wherein for the purpose of illustration is shown a preferred embodiment of my invention and wherein:—

Figure 1 is an end elevation of a bed constructed in accordance with my invention, parts being broken away and parts being shown in section;

Figure 2 is a similar side elevation of the bed;

Figure 3 is a fragmentary section on the line 3—3 of Figure 1;

Figure 4 is a section on the line 4—4 of Figure 2;

Figure 5 is a section on the line 5—5 of Figure 2;

Figure 6 is a section on the line 6—6 of Figure 1.

Referring now more particularly to the drawings, the crib comprises corner posts 10, side and end structures 11 and 12 and a bottom or spring section 13. Each end post 10 is formed in upper and lower main sections 14 and 15 and a cap or key section 16. The sections 14, 15 and 16 are formed of lengths of the same sized tubular material and suitably keyed together by inserting in the lower end of the section 14 and in the lower end of the section 16 key pieces 17 and 18, the ends of which project for engagement in the upper ends of the sections 15 and 14 respectively. These key pieces fit the bores of the tubular sections 14 and 15, so that the sections are maintained rigidly in alignment with one another. Each corner post has formed therein immediately below the upper end of the section 14 right angularly disposed openings 19 and 20 for the reception of the top rounds 21 and 22 of the side and end members 11 and 12. The key pieces 18 of the cap section 16 have reduced extremities 23 adapted to pass through openings 24 formed in these rounds and lock them in position within the posts. Adjacent their lower ends, the sections 14 of these posts are formed with openings 25 for the reception of the lower rounds 26 of the end members and the upper ends of the sections 15 are provided with openings 27 for the reception of the lower rounds 28 of the side members. These lower rounds 28 of the side members are secured in position within the posts by transversely extending keys 29 which are inserted after the rounds have been placed in position. Adjacent faces of the posts 10 at each end of the bed are provided upon the upper ends of the sections 15 thereof with outstanding U-shaped brackets 30, the inner surfaces of which are slotted at 31, for a purpose presently to appear.

Each end member 12 comprises in addition to the upper and lower round members 22 and 26 a plurality of vertically extending rounds 32, the ends of which are adapted to be inserted in openings formed in adjacent faces of the rounds to provide the assembled end structure. Each side section 11 has its rails 21 and 28 formed in two separable sections 21ª and 21ᵇ, 28ª and 28ᵇ, these sections being secured together by inserting in adjacent ends thereof a smaller element 33 slidably fitting the bores of the rails. Each rail 28, 21 has in adjacent faces openings 34 for the reception of the ends of rounds 35 and certain of these rounds extend likewise into openings 36 formed in the telescoping connecting member 33, thus locking the sections of the rail against separation when the side structures are in assembled relation.

The spring structure 13 comprises two shaft sections 37 and 38 connected by a flexible spring structure 39. At each end, these shafts have enlarged circular heads 40 to fit in the groovs 31 of the U-shaped brackets, the shafts fitting between the adjacent faces of the arms of the U. The shaft 38 has an opening permitting insertion of a lever 39ª, by means of which the shaft may be rotated to tension the spring and the heads 40 of this shaft have openings 41 for coaction with corresponding openings formed in the wall of the bracket for the reception of locking pins 42 for securing the shaft in rotatably adjusted positions to maintain the tension of the spring.

It will be noted that the shafts 37 and 38, in addition to providing a mounting for the ends of the spring, likewise serve as a means for locking the lower ends of the legs at corresponding ends of the bed against separation from one another. A structure of this character may be readily knocked down and will require but a small receptacle for its transportation.

Since the structure hereinbefore set forth is capable of a certain range of change and modification without matrially departing from the spirit of the invention, I do not limit myself to such specific structure except as hereinafter claimed.

I claim:—

In a bed, corner posts, collapsible side and end structures connecting said corner posts and maintaining the corner post in properly spaced relation, the corner posts of each end pair being provided upon opposed faces with U-shaped brackets, shafts fitting between the arms of the brackets, opposing inner faces of the arms of the brackets being grooved, the shafts having heads extending into the grooves and a spring structure connecting said shafts, one of said shafts having means for connecting a lever thereto whereby the shaft may be rotated, one of the heads of said shaft and said bracket having aligning openings for the reception of a lock pin whereby the shaft may be held in rotatably adjusted positions, said collapsible end structures comprising detachable connecting means by which the upper ends of the posts are held in spaced relation and the shaft heads when positioned in the grooved brackets serving to hold the lower ends of the legs in spaced relation.

In testimony whereof I hereunto affix my signature.

GILBERT OTIS DE HASS.